United States Patent Office 2,913,322
Patented Nov. 17, 1959

2,913,322

HALOGEN SUBSTITUTED CARBOXANILIDES

David J. Beaver, Richmond Heights, Paul J. Stoffel, St. Louis, and Philip C. Hamm, Webster Groves, Mo., assignors to Monsanto Chemical Company, St. Louis, Mo., a corporation of Delaware No Drawing. Application December 29, 1955
Serial No. 556,064

6 Claims. (Cl. 71—2.5)

This invention relates to new and novel halogen substituted carboxanilides exhibiting remarkable contact herbicidal specificity.

In accordance with this invention it has been found that carboxanilides of the structure

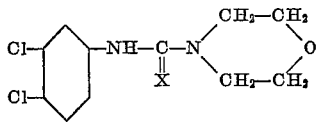

where X is sulfur or oxygen, represent a new and highly useful family of compounds, particularly with respect to ridding corn fields of undesirable vegetation.

As illustrative of the preparation of these new compounds is the following:

*Example I*

4.4 parts by weight of morpholine and 9.4 parts by weight of 3,4-dichlorophenyl isocyanate are mixed together with 36 parts by weight of diethyl ether at room temperature. The reaction is highly exothermic. The mass is agitated for about two hours and filtered. The collected residue is washed with diethyl ether and dried. Upon recrystallization from ethanol 12.4 parts by weight of N-morpholine 3,4-dichloro-carboxanilide (M.P. 157.1–157.8° C.)

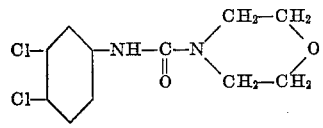

is obtained as a fine white crystalline powder.

*Example II*

4.4 parts by weight of morpholine and 10.2 parts by weight of 3,4-dichlorophenyl isothiocyanate are mixed together with 78 parts by weight of ethyl alcohol. The reaction is mildly exothermic and the mass is refluxed for about one hour. The mass is cooled, filtered and the residue washed with ethyl alcohol and dried. The product obtained is N-morpholine 3,4-dichloro-thiocarboxanilide

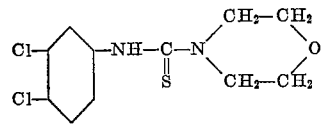

as white needles (M.P. 197.5–198.1° C.).

In order to illustrate the outstanding properties of this invention spray testing of compositions containing the following:

A. morpholine 3,4-dichlor-carboxanilide
B. morpholine 3-chlor-carboxanilide
C. morpholine 4-chlor-carboxanilide
D. morpholine 3,4-dichlor-thiocarboxanilide was conducted as follows:

Respective acetone solutions of compounds A, B, C and D, set forth above were dispersed in water, the quantity of dispersion employed being calculated to give sprays containing 0.05% by weight, respectively, of the compound to be tested.

The respective sprays were applied to two-week-old greenhouse flats planted to corn and containing a variety of grasses and broadleafs until droplets formed on and/or fell from the foliage and stems of the sprayed plants. The sprayed plants were then allowed to remain under standard conditions of sunlight and watering for a period of ten days. At the end of that time the sprayed plants were compared in order to determine the extent of injury, if any. The following observations were made:

| Compound Tested at 0.05% Concentration | Extent* of Injury on— | | |
|---|---|---|---|
| | (a) Grass | (b) Broadleaf | Corn |
| Compound A | 4 | 3 | unaffected. |
| Compound B | 1 | 1+ | Do. |
| Compound C | 1 | 1+ | Do. |
| Compound D | 3 | 3+ | Do. |

*4=plant dead; 3=severe injury; 2=moderate injury; 1=slight effect; 0=no effect.
(a)=Grasses included were wild oat, brome, rye and foxtail.
(b)=Broadleafs included were buckwheat, radish, clover, beet, cucumber and moss rose.

Herbicidal compositions containing the present compounds may be aqueous suspensions or oil-in-water emulsions of the compounds, but preferably aqueous suspensions containing a phytotoxic amount of the new herbicidal agent. The aqueous suspension may be obtained simply by dissolving them in effective proportions in a suitable organic solvent and dispersing the solution in water employing a wetting agent. Dispersing or emulsifying agents such as the alkyl aryl sulfonates and the polyethylene glycol derivatives are advantageously employed in the preparation of the herbicidal suspensions or emulsions, and a wetting or penetrating agent is desirable for simple aqueous suspensions. The present compounds are preferably applied by spraying aqueous suspensions or oil emulsions of the same, this method affording an easy and inexpensive way of destroying plant growth. For general utility aqueous suspensions having concentrations of 0.01 to 10 parts of the new contact herbicides per 100 parts water may be employed, and in this manner an acre of growing corn may be freed of undesirable vegetation by application thereto of only a few pounds of the new contact herbicides.

Because of the high herbicidal activity of the present compounds they are advantageously applied by mixing them with inert, liquid or solid ingredients as carriers. Valuable herbicidal compositions are prepared by incorporating small amounts (e.g. 0.01 to 10% by weight) of the new compounds into such carriers as water, hydrocarbon oils, organic solvents, dusts such as bentonite, pumice, etc. Sprays may also be prepared by dissolving the chemicals in oils or organic solvents to make concentrates and then adding small amounts of the concentrates to water, advantageously in the presence of an emulsifying, wetting or dispersing agent. Emulsions and dispersions thus prepared have the property of adhering to the plant foliage for a long period of time.

What is claimed is:

1. Halogen substituted carboxanilides of the structure

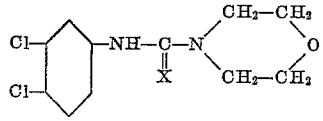

where X is a member of the group consisting of sulfur and oxygen.

2. N-morpholine 3,4-dichloro-carboxanilide.
3. N-morpholine 3,4-dichloro-thiocarboxanilide.
4. The method of destroying undesirable vegetation which comprises contacting such vegetation with a herbicidal composition comprising an inert carrier, and as the essential active ingredient a compound of claim 1.
5. The method of destroying undesirable vegetation which comprises contacting such vegetation with a herbicidal composition comprising an inert carrier, and as the essential active ingredient a compound of claim 2.
6. The method of destroying undesirable vegetation which comprises contacting such vegetation with a herbicidal composition comprising an inert carrier, and as the essential active ingredient a compound of claim 3.

References Cited in the file of this patent
UNITED STATES PATENTS

| | | |
|---|---|---|
| 2,655,444 | Todd | Oct. 13, 1953 |
| 2,655,445 | Todd | Oct. 13, 1953 |
| 2,663,729 | Searle et al. | Dec. 22, 1953 |
| 2,709,648 | Ryker et al. | May 31, 1955 |
| 2,722,550 | Schollenberger | Nov. 1, 1955 |
| 2,723,192 | Todd | Nov. 8, 1955 |
| 2,729,677 | Gilbert et al. | Jan. 3, 1956 |
| 2,781,330 | Downey | Feb. 12, 1957 |

OTHER REFERENCES

McVeigh et al.: Chemical Society Journal (London), 1945, pages 621–622.